United States Patent
Yarygin

(10) Patent No.: US 10,129,318 B2
(45) Date of Patent: Nov. 13, 2018

(54) MEDIA STREAM DATA AND CONTROL PARAMETER SYNCHRONIZATION

(71) Applicant: Silicon Image, Inc., Sunnyvale, CA (US)

(72) Inventor: Sergey Yarygin, San Jose, CA (US)

(73) Assignee: LATTICE SEMICONDUCTOR CORPORATION, Portland, OR (US)

( * ) Notice: Subject to any disclaimer, the term of this patent is extended or adjusted under 35 U.S.C. 154(b) by 390 days.

(21) Appl. No.: 14/617,755

(22) Filed: Feb. 9, 2015

(65) Prior Publication Data

US 2015/0326635 A1    Nov. 12, 2015

Related U.S. Application Data

(60) Provisional application No. 61/989,415, filed on May 6, 2014.

(51) Int. Cl.
*G06F 15/16* (2006.01)
*H04L 29/06* (2006.01)

(52) U.S. Cl.
CPC .......... *H04L 65/608* (2013.01); *H04L 65/602* (2013.01); *H04L 65/80* (2013.01)

(58) Field of Classification Search
CPC ...... H04L 65/608; H04L 65/80; H04L 65/602
See application file for complete search history.

(56) References Cited

U.S. PATENT DOCUMENTS

| | | | | |
|---|---|---|---|---|
| 2006/0029139 A1* | 2/2006 | Teichner | ............... | H04L 43/106 375/240.28 |
| 2009/0034559 A1* | 2/2009 | Jung | ........................ | H04N 5/76 370/512 |
| 2010/0277567 A1 | 11/2010 | Takizuka et al. | | |
| 2011/0029677 A1* | 2/2011 | Altmann | ............... | H04L 1/1607 709/228 |
| 2012/0154530 A1* | 6/2012 | Yamada | ............... | H04N 13/007 348/43 |
| 2013/0223293 A1 | 8/2013 | Jones et al. | | |

FOREIGN PATENT DOCUMENTS

| | | |
|---|---|---|
| CN | 102484557 A | 5/2012 |
| TW | 200623765 A | 7/2006 |

OTHER PUBLICATIONS

PCT International Search Report and Written Opinion, PCT Application No. PCT/US2015/027380, dated Jul. 13, 2015, 11 pages.
Taiwan Patent Office, Office Action, TW Patent Application No. 104110753, dated Sep. 19, 2018, 12 pages. (with concise explanation of relevance).

* cited by examiner

*Primary Examiner* — Michael A Keller
(74) *Attorney, Agent, or Firm* — Fenwick & West LLP

(57) ABSTRACT

Embodiments of the present disclosure relate to transmitting or receiving a media stream and associated control parameter over different physical channels. The transmitter transmits a media stream over a first physical channel and at least one associated control parameter along with a time parameter associated with a part of the media stream over a second physical channel. The associated control parameter along with the time parameter is sent before the media stream to the receiver. The receiver processes the media stream, by extracting the control parameter and time parameter associated with a part of the media stream, and at least applying the extracted control parameter to the part of the media stream.

13 Claims, 6 Drawing Sheets

MEDIA STREAM DATA AND CONTROL PARAMETER SYNCHRONIZATION

CROSS REFERENCE TO RELATED APPLICATIONS

This application claims priority to U.S. Application Ser. No. 61/989,415, filed on May 6, 2014, which is incorporated by reference herein in its entirety.

BACKGROUND

1. Field of the Disclosure

The present disclosure relates to a circuit for transmitting and receiving multimedia stream data and control parameter over different physical channels and their synchronization.

2. Description of the Related Art

In a multimedia communication system, a transmitting device transmits audio or video data across an interface to a receiving device. The audio or video data generally comprises of a media stream and its associated control parameters, for example a scene change indicator, a compression parameter, and a scaling parameter. The transmitter transmits the media stream and the control parameters over the high speed uni-directional bus of the interface to the receiver.

Such transmitting of the audio or video data over the same uni-directional bus provides synchronization of the media stream with its control parameters, although such transmission requires a lot of bandwidth, especially if the associated control parameter is of a significant size.

SUMMARY

Embodiments of the present disclosure relate to transmitting a media stream and its associated control parameter over different physical channels. A transmitter for transmitting a media stream includes a video source, a time marking circuit and a transmission module. The video source provides a media stream. The time marking circuit is coupled to the video source and extracts a control parameter associated with a part of the media stream. The transmission module is coupled to the video source and the time marking circuit. The transmission module transmits the media stream over a first physical channel and transmits the extracted control parameter and a time parameter associated with the part of the media stream over a second physical channel to the receiver. The second physical channel is separate from the first physical channel.

In one embodiment, the control parameter may include at least one of a scene change indicator, a compression parameter, a pixel format indication parameter, an electro-optical transfer function indication parameter, luminance information, associated text parameter, a scaling parameter, a colorimetric information parameter, a gamut information parameter, a video format indication parameter or other similar control parameters associated with audio and visual content. The time parameter may include synchronization data for the media stream and the control parameter associated with the part of the media stream.

In one embodiment, the first and second physical channels comply with the Mobile High-Definition Link (MHL) or High Definition Multimedia Interface (HDMI) standard.

In one embodiment, the transmitter further includes a delay module between the video source and the transmission module. The delay module sends the media stream from the video source and processing circuit to the video transmission module with a predetermined time delay. The predetermined time delay is relative to the control parameter and the time parameter.

In one embodiment, the transmitter further includes a time adjuster coupled to the transmission module. The time adjuster receives a time mark (for e.g. a frame count of a video stream) of the media stream being processed at the transmission module. The time adjuster adjusts a time mark corresponding to the predetermined time delay to the received current time mark to generate the time parameter.

In one embodiment, the extracted control parameter and the time parameter are transmitted before the media stream.

Embodiments also relate to receiving a media stream. A receiver for receiving the media stream includes a receiving module, a processor and a video processing circuit. The receiving module receives the media stream over a first physical channel. The receiving module also receives the control parameter and time parameter over a second physical channel. The processor is coupled to the receiving module and extracts the control parameter and the time parameter. The video processing circuit is coupled to the receiving module and the processor and processes the received media stream by at least applying the extracted control parameter to the part of the media stream.

In one embodiment, the extracted control parameter and the time parameter are received by the receiver before the part of the media stream.

In one embodiment, the receiver further includes a comparator module between the processor and the video processing unit. The comparator module compares the received time parameter with a current time mark of the media stream. The receiver further includes a switch module between the processor, comparator and the video processing module. The switch module sends the extracted control parameter to the video processing module for applying it to the part of the media stream responsive to the received time parameter corresponding to the current time mark.

BRIEF DESCRIPTION OF THE DRAWINGS

The teachings of the embodiments of the present disclosure can be readily understood by considering the following detailed description in conjunction with the accompanying drawings.

DETAILED DESCRIPTION OF EMBODIMENTS

The Figures (FIG.) and the following description relate to preferred embodiments of the present disclosure by way of illustration only. Reference will now be made in detail to several embodiments of the present disclosure, examples of which are illustrated in the accompanying figures. It is noted that wherever practicable similar or like reference numbers may be used in the figures and may indicate similar or like functionality. One skilled in the art will readily recognize from the following description that alternative embodiments of the structures and methods illustrated herein may be employed without departing from the principles of the disclosure described herein.

Embodiments of the present disclosure relate to transmitting or receiving a media stream and associated control parameter over different physical channels. The transmitter transmits a media stream over a first physical channel and at least one associated control parameter along with a time parameter associated with a part of the media stream over a second physical channel. The associated control parameter along with the time parameter is sent before the media stream to the receiver. The receiver processes the media stream, by extracting the control parameter and time parameter associated with a part of the media stream, and at least applying the extracted control parameter to the part of the media stream.

A media stream described herein refers to a stream of multimedia content including text, audio, still images, animation, video, interactivity content or any combination thereof. A part of the media stream described herein refers to an individual unit or a frame of the multimedia content. A media stream includes one or many frames of multimedia content.

A control parameter described herein refers to a parameter that can manipulate the media stream to achieve a desired result. The control parameter may include at least one of a scene change indicator, a compression parameter, a pixel format indication parameter, an electro-optical transfer function indication parameter, luminance information, associated text parameter, a scaling parameter, a colorimetric information parameter, a gamut information parameter, a video format indication parameter or other similar control parameters associated with audio and visual content. A time parameter described herein refers to a parameter that identifies a part or subset of the media stream. The time parameter may include, for example, a frame number in a video stream.

A physical channel described herein refers to a channel of physical medium that can carry electronic data.

Figure 1:
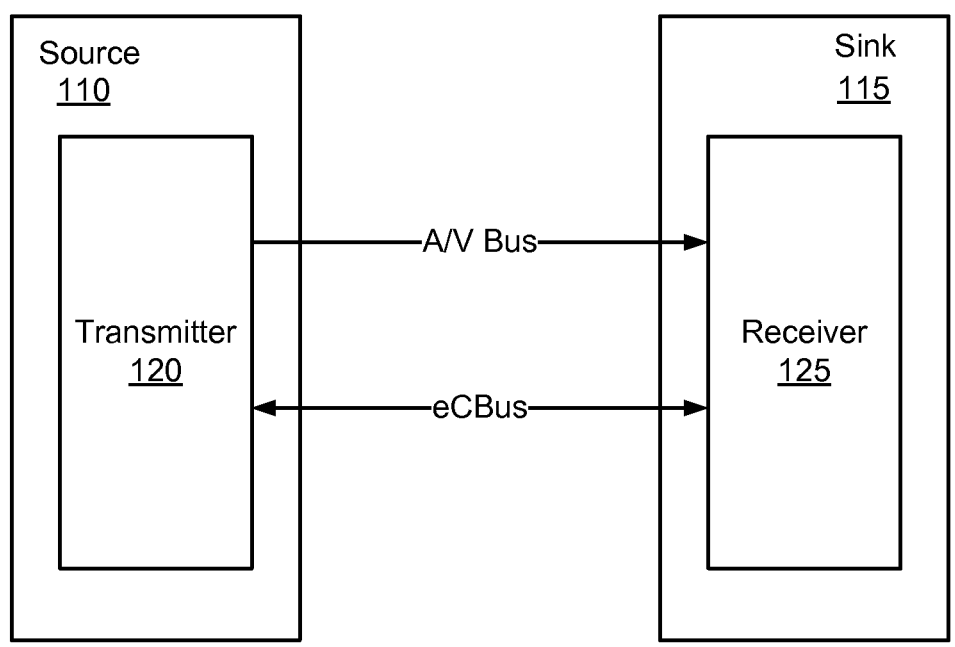
FIG. 1 is a block diagram of multimedia communication system, according to one embodiment.

FIG. 1 is a multimedia communication system 100 including a source device 110 and a sink device 115 that communicate via different physical channels, according to one embodiment. The physical channel may comply with wired or wireless communication standards. The physical channels of FIG. 1 are described primarily with reference to wired communication channels complying with the Mobile High-Definition Link (MHL) standard. However, the present disclosure is applicable to other standards such as High Definition Multimedia Interface (HDMI) or Digital Video Interface (DVI). MHL compliant physical channels may include, for example, a first physical channel embodied as Audio/Video bus (A/V bus) and a second physical channel embodied as enhanced Control bus (eCBUS). Data sent over A/V bus is encoded using transition-minimized differential signaling (TMDS) and may be multiplexed with more than one stream of data.

The source device 110 can be any device that can transmit multimedia content over the physical channels to a sink device 115. Examples of source device 110 include mobile phones, DVD/blu ray players, gaming consoles, laptop computers and tablet computers. The source device 110 includes a transmitter 120 that transmits a media stream over A/V bus and the control parameters associated with parts of the media stream over eCBUS.

The sink device 115 can be any device that can receive multimedia content over the physical channels. Examples of sink device 115 include televisions and monitors. The sink device 115 includes a receiver 125 that receives and processes the media stream and the control parameters associated with parts of the media stream. The sink device 115 may reproduce the received multimedia content.

Figure 2:
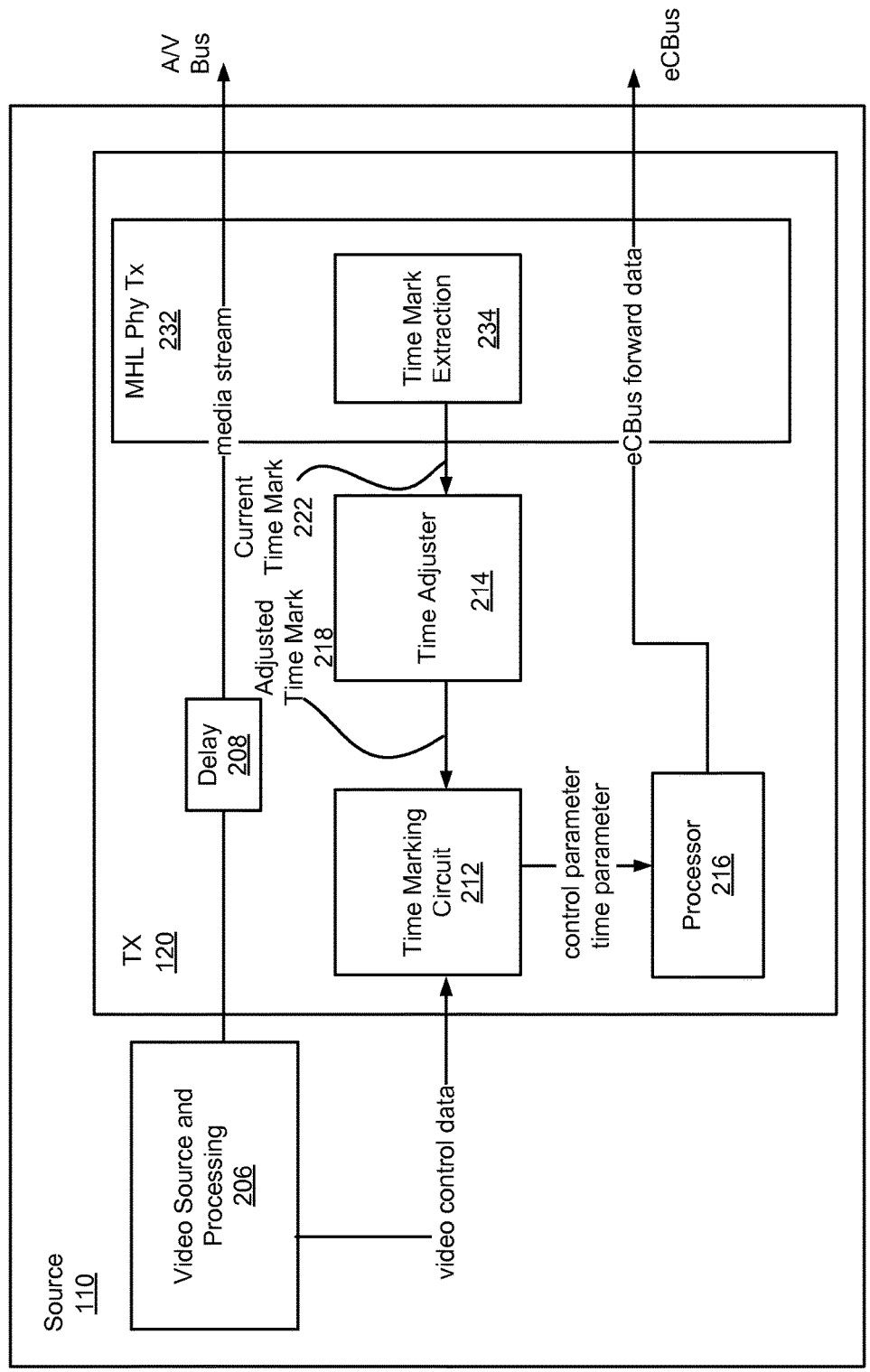
FIG. 2 is a block diagram of a source device, according to one embodiment.

FIG. 2 is a detailed view of the source device 110, according to one embodiment. The source device 110 may include, among other components, a video source and processing module 206 and transmitter 120. Video source and processing module 206 provides a media stream and video control data to the transmitter 120. Although not illustrated in FIG. 2, video source and processing module 206 may include (i) a video source that generates a stream of multimedia content, and (ii) a video processor that processes the stream of multimedia content. As part of the processing at the video processor, the video source and processing module 206 may provide a video control data associated with the stream of multimedia content to the transmitter 120. The video control data may include at least one of a scene change indicator, a compression parameter, a pixel format indication parameter, an electro-optical transfer function indication parameter, luminance information, associated text parameter, a scaling parameter, a colorimetric information parameter, a gamut information parameter, a video format indication parameter or other similar control parameters associated with audio and visual content.

The transmitter 120 is hardware, firmware, software or its combination that formats the received media stream and its associated control parameter information pursuant to the MHL standard (or any other applicable standards) and sends it to the receiver 125. Transmitter 120 may include, among other components, a delay module 208, a time marking circuit 212, a processor 216, a time adjuster 214, a time mark extraction module 234 and a transmission module 232.

The delay module 208 is hardware, firmware, software or its combination that delays the media stream by a predetermined time before sending it to the transmission module 232. The delay module 208 receives the media stream from the video source module 206 and sends the media stream to the transmission module 232 after a predetermined time delay. The media stream is sent to the receiver 125 at time later than its associated control parameter. The time delay corresponds to an amount of time by which the media stream is delayed for transmission such that the associated control parameter is sent to the receiver before the media stream. The delay module 208 may be embodied as a circuit or a data path that results in a propagation delay. The propagation delay may be introduced by design or may be corollary to other processing at the circuit or path.

The time marking circuit 212 is hardware, firmware, or its combination that adds a time mark to the video control data. The time marking circuit 212 also receives an adjusted time mark of the media stream from a time adjuster module 214. The adjusted time mark 218 received from the time adjuster 214 matches the delay in the delay module 208. For example, a time parameter associated with a video stream may be a frame count. In audio stream, the time parameter may be an audio sample number. In the examples described herein, an adjusted time mark 218 is used as the time parameter indicating a time mark applicable with the control parameter.

The time adjuster 214 is hardware, firmware, software or its combination that generates an adjusted time mark 218 indicating a time mark associated with the control parameter. The time adjuster 214 is coupled between the time marking circuit 212 and the transmission module 232. The time adjuster 214 receives a current time mark 222 from a time mark extraction module 234 that is included in the transmission module 232. The time adjuster 214 adjusts a time mark (e.g. a frame count) corresponding to the predetermined time delay, to the received current time mark 222 and generates the adjusted time mark 218. For example, if the current time mark 222 (e.g. the current frame being processed) is $20^{th}$ frame and the extracted control parameter is applicable at the $30^{th}$ frame, the time adjuster 214 will add 10 frame numbers to the current time mark 222 to generate the adjusted time 218. Hence, the adjusted time mark 218 sent to the time marking circuit 212 will indicate $30^{th}$ frame.

The time mark extraction module 234 is hardware, firmware, software or its combination that keeps track of the outgoing media stream and maintains a current time mark 222 associated with the outgoing media stream. The current time mark 222 is an indicator of the time when the control data may be applied by the receiver to the media stream.

The processor module 216 is hardware, firmware, software or its combination that receives the extracted control parameter and the time parameter from the time marking circuit 212, and formats them into an eCBUS forward data packet that can be sent over the eCBUS.

The transmission module 232 is hardware, firmware, software or its combination that formats the media stream into encoded data including video data packets or data island packets pursuant to the MHL standard that can be sent over the A/V Bus. The transmission module 232 further formats the control parameter and the time parameter associated with the part of the media stream into encoded data including eCBUS forward data packets pursuant to the MHL standard that can be sent over the eCBUS.

Figure 3:
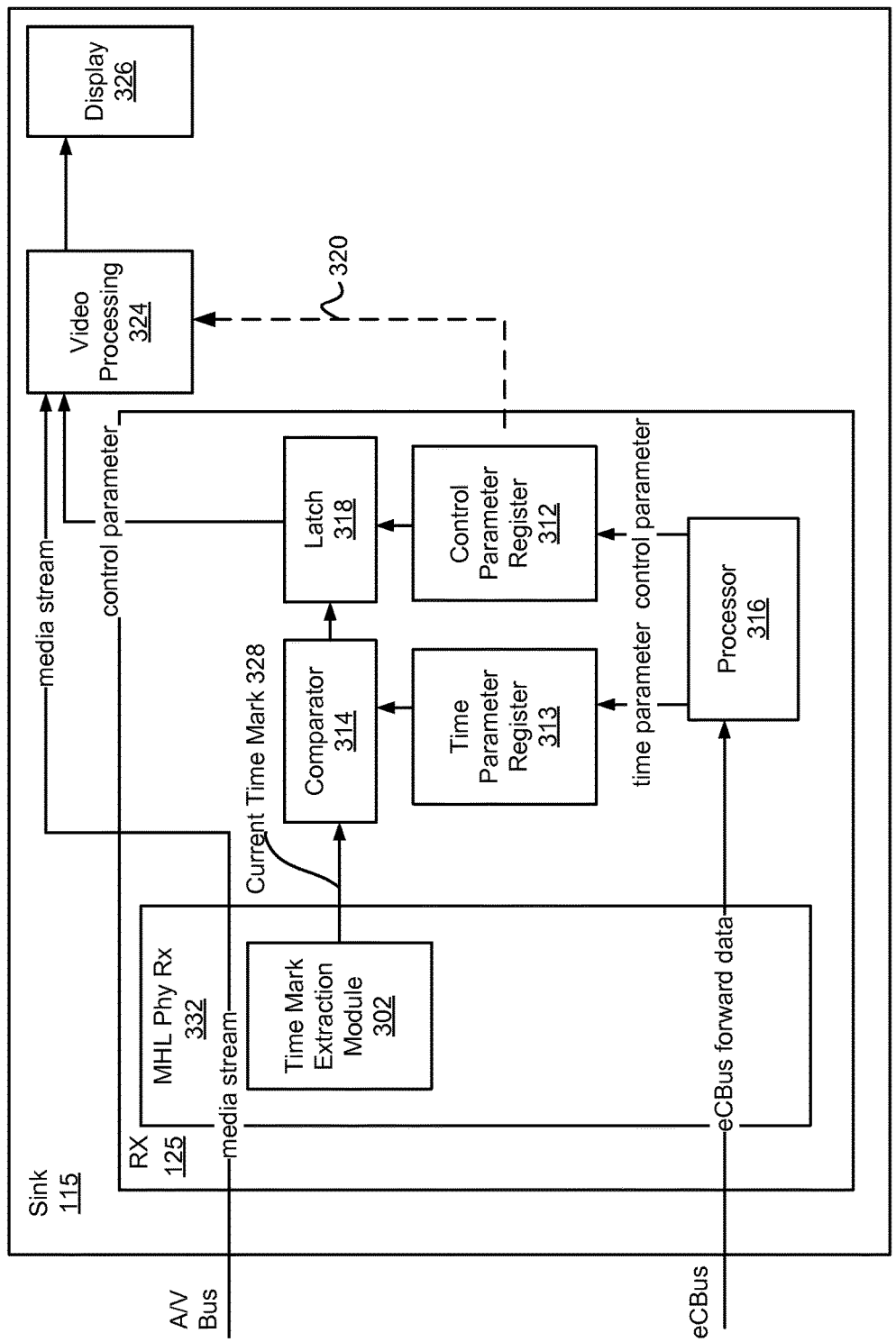
FIG. 3 is a block diagram of a sink device, according to one embodiment.

FIG. 3 is a detailed view of the sink device 115, according to one embodiment. The sink device 115 may include, among other components, a receiver 125, a video processing module 324 and a display device 326.

The receiver 125 is hardware, firmware, or a combination of hardware and software that receives the media stream over the A/V Bus and the data packet including the control parameter and time parameter over the eCBUS. The receiver 125 converts the encoded data received over the A/V Bus into the media stream and sends the decoded version of the media stream to the video processing module 324. The receiver 125 further converts the encoded data received over the eCBUS to a control parameter and a time parameter associated with the media stream and sends the decoded data to the video processing module 324. Receiver 125 may include, among other components, a receiving module 332, and a time mark extraction module 302, a processor module 316, a control parameter register 312, a time parameter register 314, a comparator module 314 and a latch module 318.

The receiving module 332 is hardware, firmware, software or its combination that formats the encoded packets received over the A/V Bus and the eCBUS. The receiving module 232 receives an encoded data packet over the A/V Bus, for example, a video data packet or a data island packet pursuant to the MHL standard, decodes the data packet to a media stream, formats it and sends it to the video processing module 324 for processing it. The receiving module 332 further receives an encoded data packet over the eCBUS, for example, eCBUS forward data packet pursuant to the MHL standard, decodes the data packet to a control parameter and time parameter associated with a part of the media stream, formats the decoded parameters and sends the formatted parameters to the processor module 316.

The processor module 316 is hardware, firmware, software or its combination that receives the decoded eCBUS forward data packet and extracts the control parameter and time parameter from the eCBUS forward data packet for sending to the control parameter register module 312 and time parameter register module 313. The processor module 316 further separates the control parameter from the time parameter and then sends these parameters to the respective control parameter register module 312 and time parameter register module 313.

The control parameter register module 312 is hardware, firmware, software or its combination that stores the control parameter associated with a part of the media stream until the media stream is processed by the video processing module 324. The control parameter register module 312 receives the separated control parameter from the processor module 316 and stores the control parameter until the time parameter (in the examples described herein, the time parameter is a video frame count) matches the current time mark 328 provided by the time mark extraction module 302. Once the current time mark 328 matches the time parameter, the latch module 318 is updated with the control parameter and the control information 320 is sent to the video processing module 324 for further processing of the media stream.

The control parameter register module 312 also enables the video processing module 324 to receive the control parameters earlier than the media stream via a data path 320. Such advanced access to the control parameters enable the video processing module 324 to prepare for application of the control parameter to the media stream ahead of time. Such preparation may include, for example, reservation of resources in the video processing module 324, switching an operational mode of the video processing module 324, and setting of parameter values for operations.

The time parameter register module 313 is hardware, firmware, software or its combination that stores the time parameter associated with a part of the media stream until the media stream is processed by the video processing module 324. The time parameter register module 313 receives the separated time parameter from the processor module 316 and is sent to the comparator 314 for comparison with the current time mark 328. The time parameter is stored in the time parameter register 313 until the time parameter (in the examples described herein, the time parameter is a video frame count) matches the current time mark 328 provided by the time mark extraction module 302.

The comparator module 314 is hardware, firmware, software or its combination that compares the current time mark 328 with the time parameter to provide a control signal to the switch module 318 indicating a result of the compare. The comparator module 314 receives a current time mark 328 associated with a media stream for example, a current video frame being processed from the time mark extraction module 302 along with the time parameter from the register module 312. The current time mark 328 is compared with the time parameter. When the current time mark 328 matches the time parameter, the current part of the media stream being processed is equal to the time mark indicated by the time parameter. The application of the control parameter to the media stream is enabled at this time mark, thus allowing the synchronization of the control parameter with the media stream. The comparator module 314 sends a control signal to close the latch module 318 on a time mark match.

The latch module 318 is hardware, firmware, software or its combination that retrieves a control parameter from the register module 312 and sends the control parameter to the video processing unit 324. The latch module 318 receives a control signal from the comparator module 314 that instructs the latch module 318 update its information. The output of the latch module 318 keeps the control information from the control parameter synchronized with the media stream and sends it to the video processing module 324.

The video processing module 324 is hardware, firmware, software or its combination that applies the control parameter to the media stream at a time indicated by the time parameter. The video processing module receives the media stream from the receiving module 332 and the control parameter associated with the media stream from the latch module 318. The video processing module 324 processes the media stream by at least applying the control parameter associated with the media stream. The video processing module 324 performs decompression, scaling and other various operations associated with the control parameter and applies the control parameter to the media stream at a time indicated by the time parameter. In this way, synchronization of the control parameter with the media stream is enabled to generate a processed media stream. The processed media stream is further sent to the display device 326 for display.

The video processing module 324 may also access the register 312 to retrieve control parameters associated with parts of media stream to be processed subsequently via the data path 320. In this way, the video processing module 324 may perform preparatory operations for subsequent portions of the media stream, and thereby enhance the efficiency or speed of processing the media stream. For examples, a control parameter such as a scaling parameter may be received by the video processing module at a $30^{th}$ frame, which may be indicated by the time parameter. The video processing module 324 may be processing the $20^{th}$ frame at the time when it receives the scaling parameter for the $30^{th}$ frame. The video processing module 324 may perform preparatory operations such as training the phase locked loops and other relevant operations needed for application of the scaling parameter on the $30^{th}$ frame of the media stream. When the $30^{th}$ frame of the media stream is received by the video processing module 324, the preparatory operations will have been performed, and the video processing module 324 will perform scaling on the $30^{th}$ frame of the media stream without any further delay related to the preparatory operations, thus increasing efficiency and speed of processing the media stream.

The display device 326 displays the processed media stream. The display device 326 receives the processed media stream from the video processing module 324, for example, a scaled version of video frame of 960×720 pixels converted from an original size of 640×480 pixels by applying a scaling parameter. The display device 326 may be embodied using various technology such as liquid crystal display (LCD) and organic light emitting diode (OLED) devices.

Figure 4:
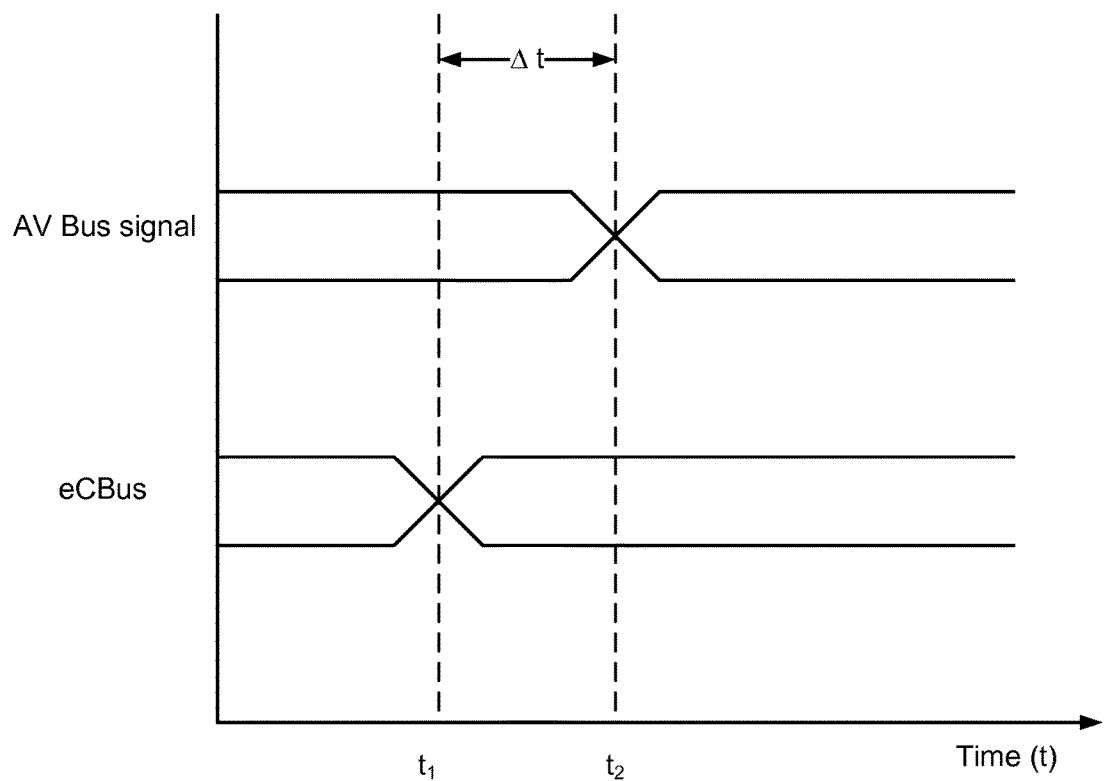
FIG. 4 is a timing diagram illustrating relationships between transmission of a media stream on a first physical channel, and transmission of a control parameter and a time parameter on a second physical channel, according to one embodiment.

FIG. 4 is a timing diagram illustrating relationships between transmission of a media stream on the A/V Bus and transmission of a data packet comprising of a control parameter and a time parameter on the eCBUS, according to an embodiment. The horizontal axis of FIG. 4 represents the time of transmission and the vertical axis represents the data transmitted on the first physical channel A/V Bus and the second physical channel eCBUS.

As illustrated in FIG. 4, the data packet including the control parameter and time parameter is transmitted at time t1 over the eCBUS. The video data packet comprising of the media stream is transmitted over the AV Bus at time t2. As illustrated in the example of FIG. 4, the data packet including the control parameter and time parameter is transmitted at a time Δt earlier than the video data packet comprising of the media stream. The time Δt equates to a time t2−t1.

The control parameter is transmitted earlier in time than its associated part of the media stream. The transmission of the control parameter earlier over the relatively slower eCBUS as compared to the A/V Bus allows for the compensation of delay associated with the transmission. Additionally, the video processing module 324 may perform preparatory operations for subsequent portions of the media stream with which the control parameter is associated, thereby enhancing the efficiency or speed of processing the media stream. For example, the current frame being processed at time t1 may be the $20^{th}$ frame of the media stream. The control parameter associated with the $30^{th}$ frame of the media stream may be sent on the eCBUS at time t1. The $30^{th}$ frame of the media stream may be sent at time t2, thus allowing the video processing module 324 to perform preparatory operations for the $30^{th}$ frame of the media stream within the time Δt. The control parameter for the $30^{th}$ frame is applied to the media stream at time t2 enabling synchronization of the control parameter and the media stream to generate a processed media stream to be sent for display.

Figure 5:
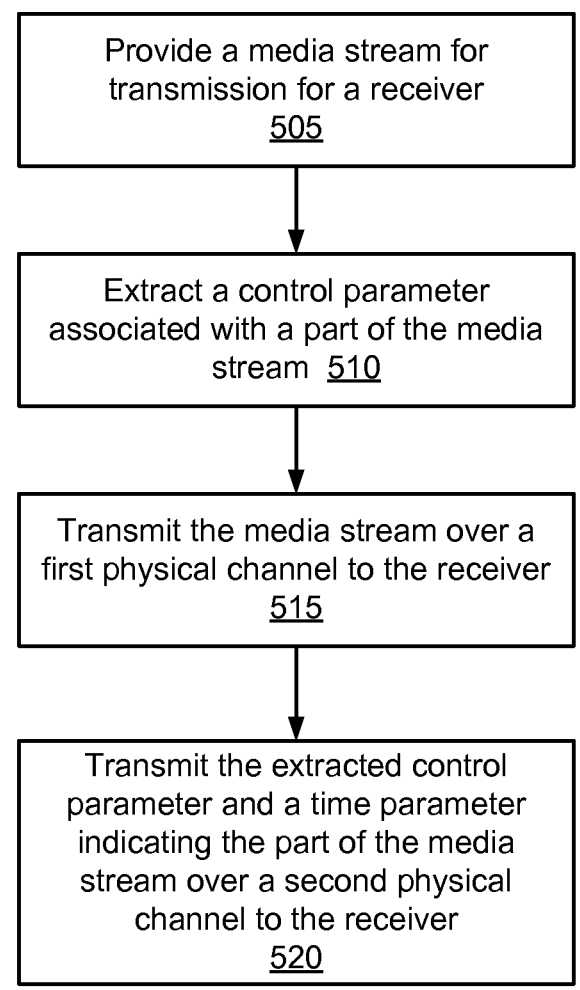
FIG. 5 is a flowchart illustrating operations in the transmitter, according to one embodiment.

FIG. 5 is a flowchart illustrating operations 500 in the transmitter, according to an embodiment. A media stream is provided 505 to a transmitter 120 for transmission to a receiver 125. The media stream may include any multimedia content.

The transmitter extracts 510 a control parameter associated with a part of the media stream. The control parameter may be one or more of a scene change indicator, a compression parameter, a pixel format indication parameter, an electro-optical transfer function indication parameter, luminance information, associated text parameter, a scaling parameter, a colorimetric information parameter, a gamut information parameter, a video format indication parameter or other similar control parameters associated with audio and visual content.

The media stream is transmitted 515 over a first physical channel, the A/V Bus, to the receiver 125. The extracted control parameter and a time parameter indicating the part of the media stream is transmitted 520 over the second physical channel, eCBUS, to the receiver 125.

The extracted control parameter and the time parameter are sent over the eCBUS at a time earlier than the media stream is sent over the A/V bus. This allows the receiver 125 to perform preparatory operations for processing the media stream, prior to receiving the media stream. This increases the efficiency and speed of processing the media stream.

Figure 6:
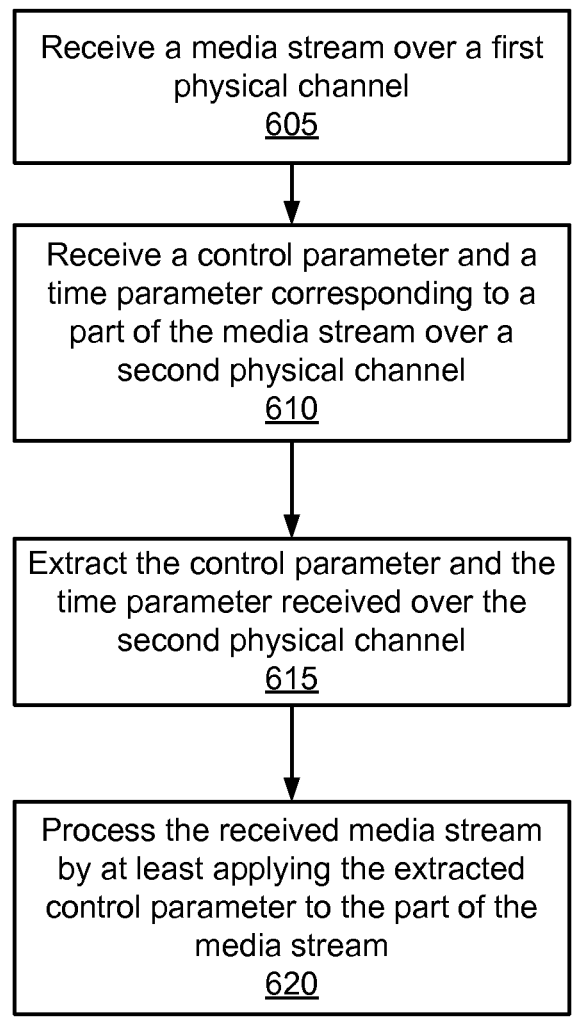
FIG. 6 is a flowchart illustrating operations in the receiver, according to one embodiment.

FIG. 6 is a flowchart illustrating operations 600 in the receiver, according to an embodiment. The receiver 125 receives 605 a media stream over the first physical channel, A/V Bus. The receiver 125 further receives 610 a control parameter and a time parameter corresponding to a part of the media stream over the second physical channel, eCBUS.

The receiver 125 receives the control parameter and the time parameter associated with the part of the media stream earlier than the media stream. The receiver 125 extracts 615 the control parameter and the time parameter received over the second physical channel, eCBUS.

The receiver 125 performs preparatory operations in advance for processing the media stream since it receives and extracts the control parameter and the time parameter before receiving the media stream. This enables the receiver to increase the speed or efficiency for processing of a media stream. The receiver 125 further processes 620 the received media stream by at least applying the extracted control parameter to the part of the media stream.

What is claimed is:

1. A transmitter for transmitting a media stream, comprising:
   a video source configured to provide a media stream;
   a transmission module coupled to the video source and the time marking circuit, the transmission module configured to:
      transmit the media stream over a first physical channel to a receiver, the media stream transmitted as a series of video data packets, each video data packet comprising media stream data and corresponding to a respective time parameter, and
      transmit a data packet comprising an extracted control parameter and an associated first time parameter corresponding to a first video data packet of the series of video data packets that comprises a first part of the media stream, the data packet transmitted over a second physical channel to the receiver separate from the first physical channel,
      wherein the data packet comprising the extracted control parameter and associated first time parameter are transmitted to the receiver before the first video data packet comprising the first part of the media stream by a predetermined delay; and
   a time marking circuit coupled to the video source and configured to extract the control parameter based upon the first part of the media stream, and to associate the extracted control parameter with the first time parameter by:
      extracting a time parameter from an outgoing data packet of the series of video data packets being processed at the transmission module, and
      determining the first time parameter by adjusting the extracted time parameter by the predetermined delay.

2. The transmitter of claim 1, further comprising a delay module between the video source and the transmission module, the delay module configured to send the media stream from the video processing circuit to the transmission module with the predetermined time delay relative to the control parameter and the time parameter.

3. The transmitter of claim 1, wherein the first and second physical channels comply with MHL or HDMI standard.

4. The transmitter of claim 1, wherein the control parameter includes at least one of a scene change indicator, a compression parameter, a scaling parameter, a pixel format indication parameter, an electro-optical transfer function indication parameter, luminance information parameter, a colorimetric information parameter, a gamut information parameter, a video format indication parameter, an audio format indication parameter or an associated text parameter.

5. A receiver for processing a media stream, comprising:
   a receiving module configured to receive:
      over a first physical channel, the media stream, the media stream comprising a series of video data packets, each video data packet comprising media stream data and corresponding to a respective time parameter, and
      over a second physical channel separate from the first physical channel, a data packet comprising a control parameter and a first time parameter and corresponding to a first video data packet of the media stream, wherein the data packet comprising the control parameter and its associated first time parameter is received before the corresponding first video data packet of the media stream;
   a processor coupled to the receiving module and configured to extract the control parameter and the associated first time parameter from the data packet;
   a video processing circuit coupled to the receiving module and the processor, the video processing circuit configured to:
      receive a time parameter corresponding to a currently received video data packet of the media stream;
      determine whether the first time parameter matches the received time parameter corresponding to the currently received video data packet of the media stream;
      delay application of the extracted control parameter to the media stream until the first time parameter corresponds to the received time parameter corresponding to the currently received video data packet of the media stream; and
      process the received media stream by at least applying the extracted control parameter to the video data packet of of the media stream that corresponds to a time parameter matching the first time parameter, the video data packet being the first video data packet.

6. The receiver of claim 5, wherein the video processing module further comprises:
   a comparator module between the processor and the video processing circuit configured to compare the first time parameter with the received time parameter corresponding to the currently received video data packet of the media stream; and
   a latch module between the processor comparator and the video processing module configured to delay application of the extracted control parameter such that the extracted control parameter is applied to the video data packet of the media stream corresponding to a time parameter matching the first time parameter.

7. The receiver of claim 5, wherein the first and second physical channels comply with MHL or HDMI standard.

8. The receiver of claim 5, wherein the extracted control parameter includes at least one of a scene change indicator, a compression parameter, a scaling parameter, a pixel format indication parameter, an electro-optical transfer function indication parameter, luminance information parameter, a colorimetric information parameter, a gamut information parameter, a video format indication parameter, an audio format indication parameter or an associated text parameter.

9. A method for transmitting a media stream, comprising:
   providing a media stream for transmission to a receiver, the media stream comprising a series of video data packets, each video data packet comprising media stream data and corresponding to a respective time parameter;
   extracting a control parameter associated with a first part of the media stream that corresponds to a first video data packet of the series of video data packets;
   associating the extracted control parameter with a first time parameter corresponding to the first video data packet corresponding to the first part of the media stream, wherein the time parameter is generated by:
      extracting a time parameter from an outgoing data packet of the series of video data packets being transmitted, and
      determining the first time parameter by adjusting the extracted time parameter by a predetermined delay;
   transmitting the media stream over a first physical channel to the receiver; and transmitting a data packet comprising the extracted control parameter and the associated first time parameter over a second physical channel to the receiver, the second physical channel separate from the first physical channel, wherein the data packet comprising the extracted control parameter and associated first time parameter are transmitted to the receiver before the first video data packet corresponding to the first part of the media stream by the predetermined delay.

10. The method of claim 9, further delaying transmission of the media data stream by a predetermined amount of time.

11. The method of claim 9, wherein the first and second physical channels comply with MHL or HDMI standard.

12. The method of claim 9, wherein the extracted control parameter includes at least one of a scene change indicator, a compression parameter, a scaling parameter, a pixel format indication parameter, an electro-optical transfer function indication parameter, luminance information parameter, a colorimetric information parameter, a gamut information parameter, a video format indication parameter, an audio format indication parameter or an associated text parameter.

13. A method for processing media stream, comprising:
receiving a media stream over a first physical channel, the media stream comprising a series of video data packets, each video data packet comprising media stream data and corresponding to a respective time parameter;
receiving, over a second physical channel separate from the first physical channel, a data packet comprising a control parameter and a first time parameter corresponding to a first video data packet of the media stream, wherein the data packet comprising the control parameter and its associated first time parameter is received before the corresponding first video data packet of the media stream;
extracting the control parameter and the associated first time parameter from the data packet received over the second physical channel;
receive a time parameter corresponding to a currently received video data packet of the media stream
determining whether the first time parameter matches the received time parameter corresponding to the currently received video data packet of the media stream;
delaying application of the extracted control parameter to the media stream until the first time parameter corresponds to the received time parameter corresponding to the currently received video data packet of the media stream; and
processing the received media stream by at least applying the extracted control parameter to the video data packet of the media stream that corresponds to a time parameter matching the first time parameter, the video data packet being the first video data packet.

* * * * *

UNITED STATES PATENT AND TRADEMARK OFFICE
CERTIFICATE OF CORRECTION

PATENT NO. : 10,129,318 B2
APPLICATION NO. : 14/617755
DATED : November 13, 2018
INVENTOR(S) : Sergey Yarygin Page 1 of 1

It is certified that error appears in the above-identified patent and that said Letters Patent is hereby corrected as shown below:

In the Claims

Column 10, Claim 5, Line 22, please replace "packet of of the media stream" with --packet of the media stream--.

Column 12, Claim 13, Line 13, "packet of the media stream", please insert --;-- after "stream".

Signed and Sealed this
Twenty-second Day of October, 2019

Andrei Iancu
*Director of the United States Patent and Trademark Office*